UNITED STATES PATENT OFFICE.

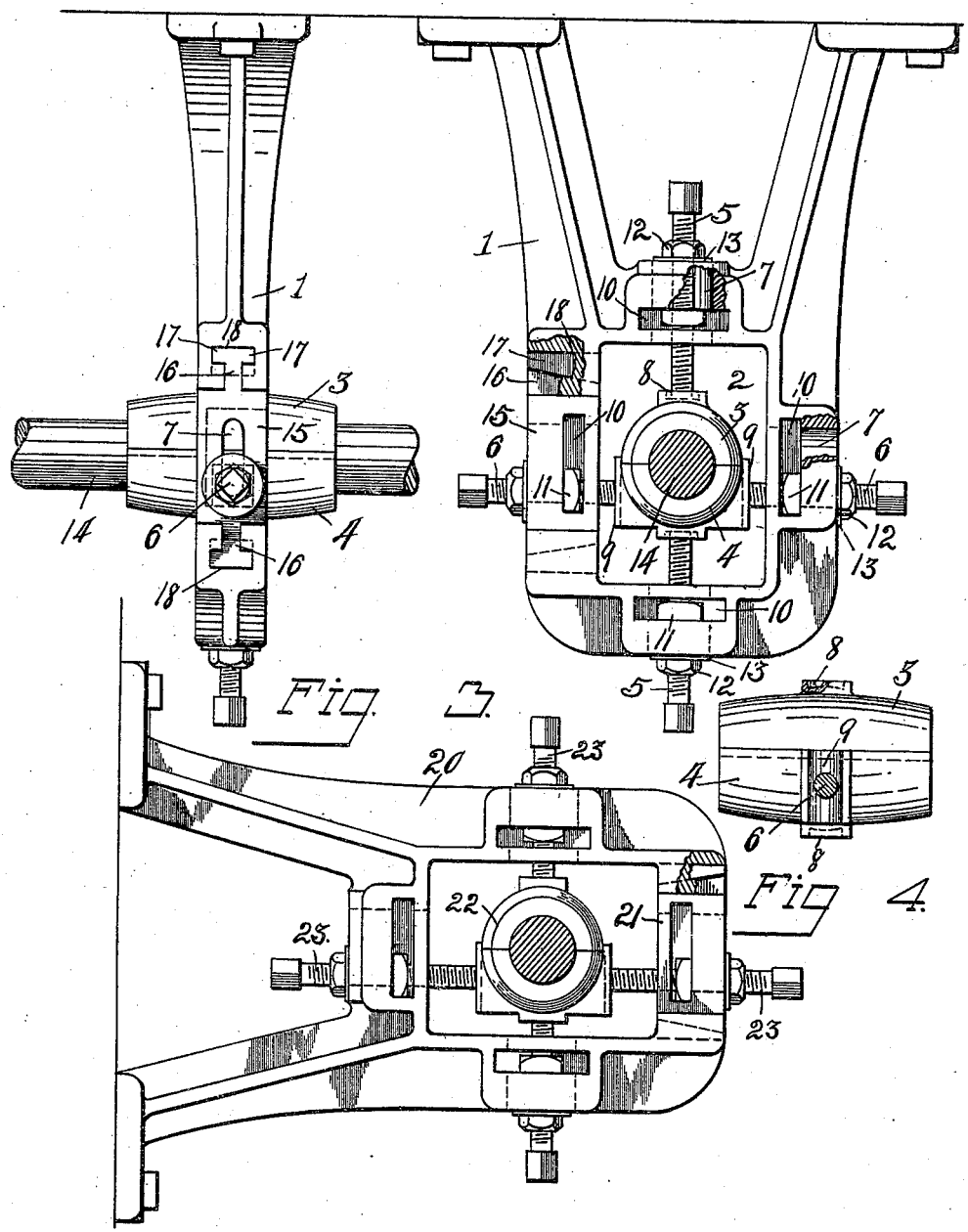

JOSEPH F. TROENDLE, OF TOLEDO, OHIO.

SHAFT-HANGER.

991,184.        Specification of Letters Patent.        Patented May 2, 1911.

Application filed July 8, 1910. Serial No. 571,005.

*To all whom it may concern:*

Be it known that I, JOSEPH F. TROENDLE, a citizen of the United States, and a resident of Toledo, in the county of Lucas and State of Ohio, have invented a certain new and useful Shaft-Hanger; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to shaft hangers, and has for its object the provision of an improved hanger of this character, which is simple and efficient in its construction, inexpensive of manufacture, and has its shaft bearing box capable of easy and rapid universal adjustment to permit an adjustment of the box within the hanger to suit the position of the shaft.

A further object of my invention is the provision of a shaft hanger having a side portion thereof easily and quickly removable to permit an insertion or withdrawal of a shaft through the opening thus provided in the hanger side, thus obviating the necessity of removing the supporting block from beneath the shaft to permit its removal from the hanger through a bottom opening therein, as has heretofore been the case, and materially lessening the labor incident to the hanging of shafts or the removal of the same from their hangers.

The invention is fully described in the following specification, and a preferred embodiment thereof illustrated in the accompanying drawings, in which,—

Figures 1 and 2 are different side views of a drop hanger embodying my invention with parts broken away and a shaft in position therein, Fig. 3 is a side view of a post hanger provided with the invention and with a portion broken away, and Fig. 4 is a side view of the bearing box and coacting set screw in section.

Referring to the drawings, 1 designates a hanger bracket of the drop type, which is provided at its lower end with the opening 2 in which the shaft bearing parts are adjustably disposed. These parts comprise the upper and lower separable bearing-box halves 3 and 4, which are held together and in proper adjustment within the opening 2 by the coöperating action of the upper and lower adjusting screws 5, 5 and the side adjusting screws 6, 6.

The screws 5 and 6 project loosely through slots 7 provided in the respective walls of the opening 2, and the screws 5 are intended to seat at their inner ends within sockets or depressions 8 provided in the top and bottom of the upper and lower bearing box halves 3 and 4, respectively, while the side screws 6 are intended to seat at their inner ends within the vertically-disposed elongated guide grooves 9 provided on the sides of the lower bearing-box half 4. The slots 7 are broadened longitudinally of the walls in which they are respectively provided to enable the screws 5 to have horizontal adjustment and the screws 6 to have vertical adjustment transversely of the shaft, as indicated.

One side wall of each slot 7 is provided with an elongated opening 10 into which a nut 11 may be inserted for threading upon the associated screw 5, 6 and for transverse adjustment with the screw in its slot 7. The wall of each slot 7 opposed to its opening 10 is preferably left closed to permit a side of the nut 11 to abut thereagainst to hold the same from turning when the screw is turned therein. A nut 12 and washer 13 are mounted on each screw without the hanger and serve to coöperate with the nut 11 on such screw and with the hanger frame to lock the screw in adjusted position, as is apparent.

To facilitate a lateral removal of the shaft 14 from, or an insertion of the same within, the opening 2 of a hanger, one side wall of such opening wholly or partially comprises a removable portion or block 15 in which the slot 7 and opening 10 of such wall are disposed. The block 15 has its ends provided with centrally-disposed longitudinally extending ribs or tongues 16, which are T-form in cross-section, and, when the block is in position within the hanger, extend outwardly from the opening 2 therein, as indicated. The end flanges 17 of the tongues 16 are longitudinally tapered to decrease in thickness from their inner ends outwardly, see Fig. 2, to adapt them to coöperate with the correspondingly shaped receiving notches or grooves 18 in the hanger-frame to limit the outward movement of the block within the frame, thus necessitating the inward removal of the block from the frame.

To remove a shaft 14 from the frame opening 2, one each of the screws 5 and 6, preferably the lower screw 5 and the side screw 6 in the block 15, is loosened and the bearing-box removed to permit the shaft to rest upon the frame bottom. This being done the block 15 is inwardly withdrawn from the hanger frame, and when the blocks of the several hangers carrying a shaft have been removed the shaft can be easily lifted through the openings provided in the side of the hangers by the removal of the blocks.

I am aware that it is old to provide a removable block in the lower end of the hanger to provide an opening through which a shaft can be removed or inserted, but such forms of hangers have not proven practical as the removal of the subjacent blocks takes the support from beneath the associated shaft and makes its removal from and insertion into the hanger very difficult, and requires the services of more men than with the use of hangers in which the removable blocks are located at the side.

A further advantage to the construction of my hanger is the ease with which the bearing-box can be adjusted in any direction to center it with the desired position of the shaft, due to each of the screws 5, 6 being capable of longitudinal and transverse adjustment within its slot 7, and the depressions 8 and grooves 9 of the bearing sections being of greater width than the coacting ends of the screws 5 and 6, see Fig. 4. The bases of the depressions 8 and grooves 9 are convexed in the respective arcs of movements of the bearing-box as indicated.

The form of hanger shown in Fig. 3 is the same as the one above described except that it is a post type of hanger and the frame is therefore adapted to project from the side of a support and the removable block is disposed at the side of the frame opposed to the post securing legs thereof. In this form 20 designates the hanger-frame, 21 the removable block, 22 the bearing-box, and 23 the adjusting screws, which work through slots in the hanger-frame opening the same as described for Figs. 1 and 2.

I wish it understood that my invention is not limited to any specific arrangement or construction of the parts except in so far as such limitations are specified in the claims.

Having thus described my invention, what I claim as new and desire to secure by Letters Patent, is,—

1. A shaft hanger comprising a hanger frame having an opening therein and having the side walls of such opening provided with slots which are broadened longitudinally of the frame, one of said walls having a removable portion which interlocks in tongue and groove manner, at its ends with the frame proper and is inwardly removable therefrom, longitudinally and transversely adjustable screws projecting through said slots, and shaft bearing parts removably held in adjusted position within said opening by such screws.

2. In a shaft hanger, a bracket having a shaft receiving opening therein, a portion of the bracket at one side of such opening being inwardly removable therefrom, said portion and bracket having complemental tongues and recesses which interlock when the portion is in position within the bracket and serve to limit the outward movements of such portion relative to the bracket, said portion, the opposite side wall and the upper and lower walls of such opening being provided with slots which extend outwardly from the opening and are broadened longitudinally of the respective opening walls, the walls of said slots being provided with elongated openings, screws adjustably projecting through said slots, nuts threaded to said screws a portion of which work in the said openings in the slot walls, said nuts coöperating with the bracket to secure the screws in adjusted positions, and bearing parts removably secured within said opening by said screws.

3. In a shaft hanger, a bracket having an opening bounded by upper and lower and opposing side walls, one of said side walls having a removable portion, said removable portion and the remainder of the associated side wall having complemental interlocking wedge parts which permit an inward withdrawal of the removable portion from the bracket, screws projecting through said walls and removable portion into said opening and capable of longitudinal and transverse adjustment in said walls, means threaded to the screws and movably coöperating with the bracket to secure the screws in adjusted positions, and shaft bearing parts removably secured within the bracket opening by said screws.

4. A shaft hanger comprising a bracket having an opening therein bounded by top, bottom and opposing side walls, one at least of such side walls being provided with an opening for the passage of the shaft into the bracket opening, a block removably fitted into said side wall opening, said side wall and block having complemental interlocking portions which are substantially T-shape in cross-section and provided with wedge surfaces for limiting the outward movements of the block within the side wall opening, said bracket opening walls and block having slots extending from said bracket opening and each slot having a portion of one side wall cut away to provide openings 10 therein, screws projecting through said slots, nuts carried by said screws within the openings 10 and without the bracket to coöperate therewith to secure the screws in adjusted positions, the nuts within the opening 10 being prevented from turning by contact with opposing portions of the slot walls, and shaft bearing parts removably secured within the bracket opening by said screws.

In testimony whereof, I have hereunto signed my name to this specification in the presence of two subscribing witnesses.

JOSEPH F. TROENDLE.

Witnesses:
M. G. GASKELL,
C. W. OWEN.

---

Copies of this patent may be obtained for five cents each, by addressing the "Commissioner of Patents, Washington, D. C."